United States Patent [19]

Farina

[11] Patent Number: 5,515,199
[45] Date of Patent: May 7, 1996

[54] OPTICAL SYSTEM EMPLOYING NEAR-INCOHERENT PROCESSING FOR DISTORTION CORRECTION

[75] Inventor: James D. Farina, Tolland, Conn.

[73] Assignee: Photonic Applications, Inc., Bloomfield, Conn.

[21] Appl. No.: 381,228

[22] Filed: Jan. 31, 1995

[51] Int. Cl.$^6$ ....................................................... G02F 1/35
[52] U.S. Cl. ...................... 359/326; 359/238; 359/239; 385/1; 385/122
[58] Field of Search ...................................... 359/326–328, 359/237–239, 245; 385/1–3, 5, 8–10, 122

[56] References Cited

U.S. PATENT DOCUMENTS 5,309,532  5/1994  Chang et al. ................................. 385/3

*Primary Examiner*—John D. Lee
*Attorney, Agent, or Firm*—McCormick, Paulding & Huber

[57] ABSTRACT

A system for correcting nonlinear distortion in fiber optic systems including communication systems by means of light modulation provided by interferometric modulators such as the Mach-Zehnder. The present invention involves the addition of a correction signal which contains error canceling information. The additive correction signal optical beam is frequency shifted or phase scrambled through the use of a phase or frequency modulator. This insures the corrective light signal adds incoherently or quasi-incoherently within the signal bandwidth of interest. Furthermore, the present system requires only a single light source and can be made independent of wavelength and is easily optimized with active servo devices. A system provided by the present invention also provides improvement over the state of the art because of its high degree of correction and independence from link length using ordinary single mode fibers.

15 Claims, 9 Drawing Sheets

OPTICAL SYSTEM EMPLOYING NEAR-INCOHERENT PROCESSING FOR DISTORTION CORRECTION

TECHNICAL FIELD

The present invention relates generally to systems for correcting nonlinear distortion in fiber optic communication systems and more particularly to an optical network that employs optical modulators and adds a correction signal on a fiber optic cable.

BACKGROUND OF THE INVENTION

The use of electrooptic modulators for high dynamic range fiber optic link applications in the communications field and in other applications has been hindered by the nonlinearity of these devices. The Mach-Zehnder modulator which is the work horse of the analog links, possesses an intrinsic nolinearity due to the interferemedic nature of its operation. Linearization of these devices has become necessary in the most demanding applications. The linearization of electrooptic modulators for high dynamic range applications has taken many forms.

Basically, there are two classes of linearization that have been explored. The first class contains those devices having electronic predistortion which electronically produces the correction for third order distortion prior to feeding the signal into a modulator. This approach is limited in its capacity to maintain the proper amount of correction over very large signal applications where higher order nonlinearities occur. In addition, the stability required in most applications is lacking and devices incorporating the electronic predistortion are difficult to produce.

The other approach which has been explored on a limited basis is founded on classic feed-forward techniques used in the design of high performance, high frequency RF amplifiers for many years. In this approach, the nonlinear element is the modulator and is driven directly by the supplied RF signal. The output of this nonlinear element is then electronically compared to the input, and an error signal is produced. The error signal is simply the difference between the input to and output of the nonlinear element. This error signal is then amplified, fed forward and combined with the output of the first nonlinear element. Care has to be taken to match the amplitude and phase of the error signal and the original output of the element in order to insure adequate cancellation of the error signal.

It would be desirable to have a system for correcting harmonic distortion in fiber optic networks which is wavelength independent and which allows the use of a single light source. The present system is drawn towards such an invention.

SUMMARY OF THE INVENTION

An object of the present invention is to provide an apparatus for correcting nonlinear distortion by means of a feed-forward correction apparatus in a fiber optic system having a single laser source.

Another object of the present invention is to provide an apparatus of the foregoing type which alters the coherence of an optical signal by means of an optical phase modifying device such that stable feed-forward correction is achieved without spurious interference signals within a selected radio frequency band.

Yet another object of the present invention is to provide an apparatus of the foregoing type in which the phase modifying device utilizes a time dependent sine wave (or combination of sine waves) variation of the differential optical phase of the optical signals.

Still another object of the present invention is to provide an apparatus of the foregoing type in which the phase modifying device generates interference terms or noise outside of the radio frequency band.

Another object of the present invention is to provide an apparatus of the foregoing type characterized by an optical delay of a source within a limited temporal coherence to alleviate interference between the combination of the main and corrective optical signals.

Another object of the present invention is to provide an apparatus of the foregoing type characterized by orthogonal states of polarization for the main and corrective optical signals.

Still another object of the present invention is to provide an apparatus of the foregoing type in which the optimization of the feed-forward network is accomplished via parametric control of optical and electrical components.

According to the present invention, a system for providing compensation for nonlinearities in an optical system that transmits data signals in a data transfer frequency band, includes an optical source for providing a coherent main optical beam; a beam splitter for receiving the optical beam and providing first and second split optical beams and a frequency generator for generating a radio frequency (RF) modulation signal whose frequency spectrum includes the data transfer frequency signal band. There is a RF signal tap for extracting a reference portion of the RF modulation signal as well as a main modulator for receiving the RF modulation signal and modulating the first split optical beam to output a modulated main optical beam having modulated and distorted optical components. A quasi-incoherent compensation apparatus includes a mechanism for generating a synthesized optical beam incoherent with the main optical beam in the data frequency signal band such that no optical interference products between the main and synthesized optical beams occur within the data transfer frequency band when the main and synthesized optical beams are combined. There is also a mechanism for generating an error signal indicative of the difference between the RF signal and said distortion portion of the main optical beam. A compensation modulator receives the error signal and modulates the second split optical beam to output a modulated compensation optical beam. An optical combiner receives the main and synthesized optical beams and provides therefrom a compensated output beam.

DESCRIPTION OF THE PREFERRED EMBODIMENT

Figure 1:
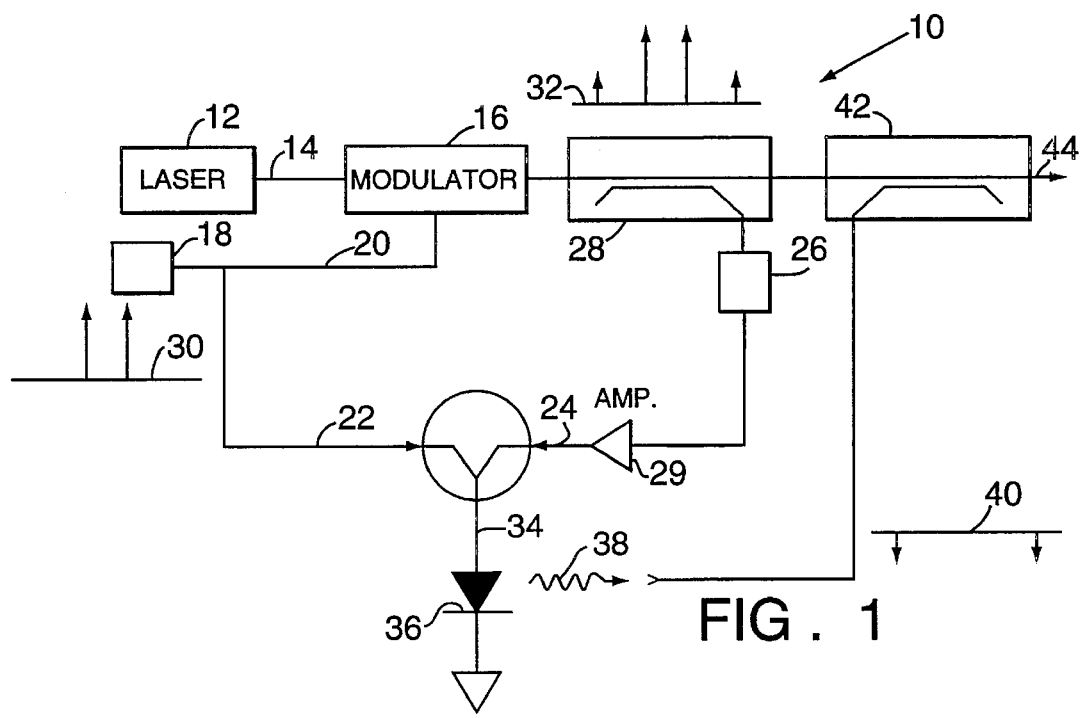
FIG. 1 is a simplified schematic representation of a known optical system providing correction for nonlinear distortion.

In a fiber optic link correction of harmonic distortion can be accomplished through the use of a known system similar to that shown in FIG. 1. In this system 10, a laser 12 generates an optical signal 14 for presentation to modulator 16. A radio frequency signal generator 18 presents an the RF signal on line 20 to the modulator while a portion thereof is taped off on line 22 for the generation of an error signal. This tapped off portion of the RF signal is combined with a pick off signal on line 24. The pick off signal is initially produced by a detector 26 connected to an optical tap 28 on the output side of the modulator and thereafter amplified by amplifier 29. A representation of the RF spectral content of the signal generated by the signal generator is shown at phase plot 30, while the phase of the modulated optical signal is indicated at phase plot 32. In these plots, phase is indicated by the upward pointing arrows.

This optical signal combination is performed such that the result is the exact signal needed to correct any errors in the modulator. An error correction signal on line 34 is then used to drive a laser diode 36 which will produce an optical signal indicated at 38 carrying the error information. The output of the laser diode whose relative phase is shown by the downward arrows of plot 40 is then combined with the modulated optical signal presented by the original modulator through the use of an optical tap 42. The resulting output signal 44 presented on the fiber is the original modulator output co-propagating with the error signal. At the detector at the end of the optical fiber (not shown), these two signals are transformed into photocurrents which add; thereby yielding the desired sum of the original signal out of the modulator and the error signal. The resulting sum should ideally be a signal resembling the original RF input.

This implementation is fraught with several drawbacks. The foremost is fact that the CW laser source used for the modulator and the laser diode are of differing wavelengths. This difference in wavelengths is always great enough that the two signals do not propagate on the fiber at exactly the same velocities due to the dispersion of standard single mode fibers used today. This difference in velocity gives way to phase shear between the error and the signal as they propagate down the fiber. After about 5–10 km of propagation, the system is incapable of correcting the nonlinear distortions of the modulator to the degree typically needed (20 dB). While it is conceivable that these can be produced on the exactly the same wavelength, it is not practical.

A solution to this problem is to use the same laser source split two ways, one for the main modulator and the other for a modulator used to generate the optical error signal. In this arrangement, the laser diode of the system of FIG. 1 is simply replaced with a modulator similar to the main modulator. This would be acceptable if it were not for the fact that, at the final optical coupler, the main optical signal and error signal add coherently in the optical domain, producing cross terms which are not present in the system 10. The cross terms are extremely sensitive to the relative phase of the two optical signals. A solution is achieved by accurately controlling the optical phase of the two beams, but such control is extremely difficult to accomplish to the degree necessary.

Figure 2:
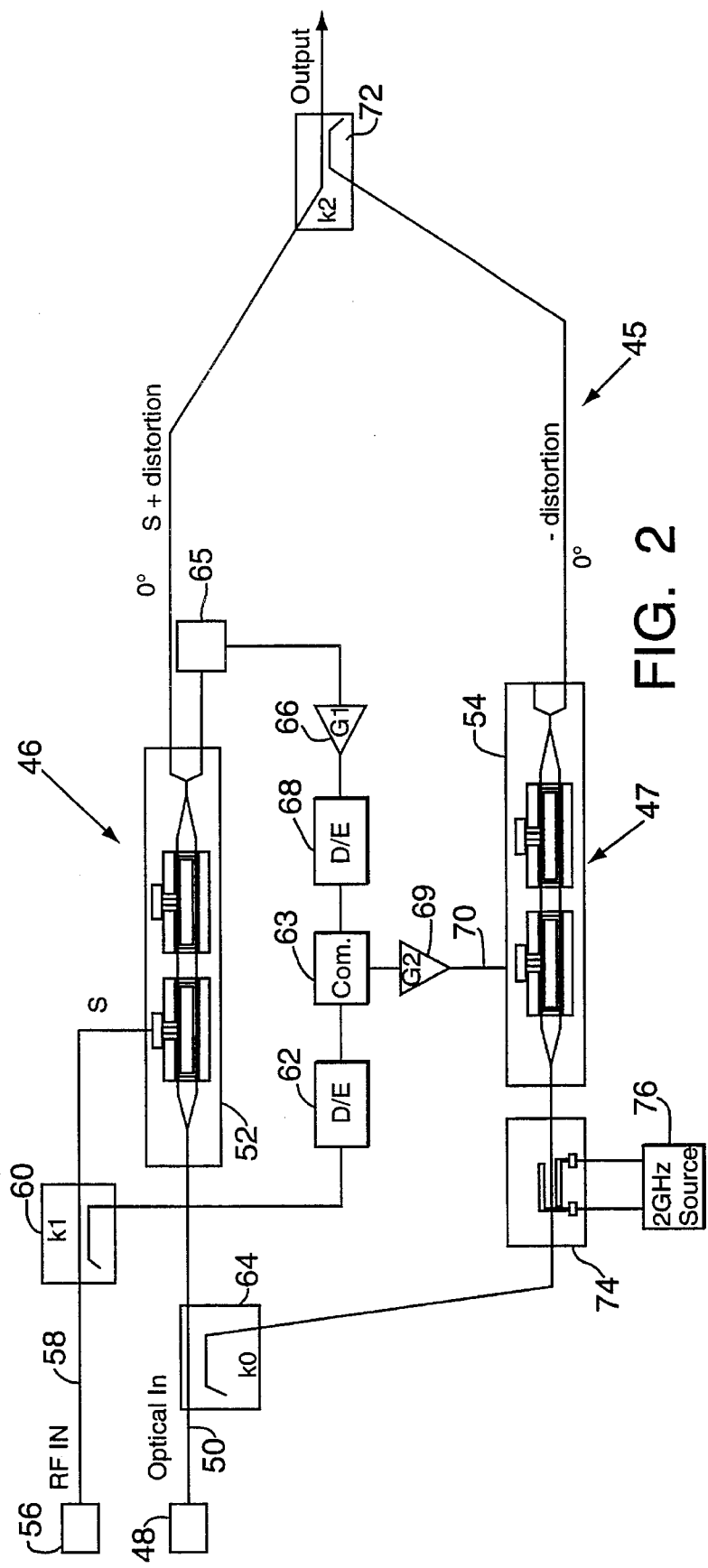
FIG. 2 is a simplified schematic representation of a system providing optical correction for nonlinear distortion as provided according to the present invention.

Referring now to FIG. 2, there is shown a system 45 provided according to the present invention having a single wavelength feed-forward topology which alleviates the coherent effects of combined beams. The present invention provides, in essence, a system with a second optical beam source by synthesizing the same from a portion of the system's laser beam. The main requirement of the synthesized optical beam is that, when combined with the system laser beam, the resultant beam produces no interference at frequencies within the band of interest; i.e., the beams are quasi-incoherent. Several embodiments of the present invention are detailed herein which manipulate the optical phases of the main and synthesized "error" beams to produce the quasi-incoherent combined beams with no deleterious spurious interference terms within the needed frequency response of the overall optical system. Techniques used in these embodiments include frequency shifting polarization rotation and time delay. Feed-forward correction of nonlinear distortion products is realized with a single laser source.

The system 45 can be divided into main and correction optical circuits 46, 47. The main optical circuit includes a laser 48 that provides an optical beam 50 that functions as the optical carrier. There is a first modulator 52 that is the "main" modulator, while a second, "error correction" or feed-forward modulator 54 is also provided. A radio frequency generator 56 presents an RF signal on line 58 to the main modulator, while a portion of that RF signal is extracted at tap 60 for presentation to delay and equalization circuitry 62 whose output is presented to a signal combiner 63.

A portion of the laser beam is also extracted by an optical splitter 64 which presents the extracted optical beam to the input of the correction modulator. A portion of the main modulated optical beam is also tapped, detected by photodetector 65 and amplified amplifier 66 and presented first to delay and equalization circuitry 68 and then to second input port on the combiner. A difference signal between the output of the main modulator and the input signal thereto is amplified by amplifier 69 and fed on line 70 to the correction modulator. The two optical beams from the main and correction modulators are then combined at final optical coupler 72 to achieve cancellation of nonlinear distortion products.

Problems arising from the interference between the optical beams can be alleviated in the frequency band of interest by appropriately modifying the differential optical phase imposed by the main phase modulator. In the feed-forward embodiment of FIG. 2, the error signal is generated in a known manner and fed to the correction modulator which generates the optical version of the error. As noted, the optical beams arriving at the final optical coupler are coherent in the RF and the optical domains. With the present invention, the optical coherence of these fields is altered by phase modulator 74 which receives the extracted optical beam before presentation the correction modulator. The phase of the extracted beam is changed to move the beam out of band by the use of a single tone constant amplitude signal such as a 2 GHz tone provided by phase modulation signal generator 76. The alteration of the coherence of the optical fields is done so as to produce no optical interference between the two beams at the final optical coupler at any frequencies within the desired bandwidth.

The simplest, but by no means the only way, to view the present invention is to utilize a frequency shifting element in place of or, for the present purposes an equivalent of, the phase modulator. Examples of frequency shifting elements could include accoustoptic devices or complex integrated optical circuits for accomplishing the same. If the optical signal (carrier) entering the error modulator has a frequency offset relative to the carrier entering the main modulator, the resulting interference of the optical beams at the output coupler would occur at a frequency equal to this offset. The resulting photocurrent in a detector placed at the end of a fiber optic cable, for example, would contain the two signals, error and main, and an interference term which is around the frequency offset. This can be expressed as $$I_{out} = S^2 \text{ Main} + S^2 \text{ Error} + F(S_{Main} \times S_{Error}) \quad (1)$$

Where $I_{out}$ is the photocurrent in the detector, $S_{Main}$ and $S_{Error}$ are the optical field amplitudes from the main and error modulators respectively, and F is a function of the product represented in its argument. It is in this function, F, that the interfering cross terms are recovered. As stated above however, the frequency content of the signals represented by the function F would be centered around the frequency offset and out of the band of interest.

In the embodiment shown in FIG. 2, the phase modulator is used, effectively, to frequency shift the optical carrier at a frequency greater than twice the bandwidth. In addition, if the phase modulator is driven such that the peak to peak phase deviation is equal to 2.405 radians (corresponding to $J_0$, the first zero of the Bessel function), the spectrum of the optical carrier signal entering the error modulator will posses energy at frequencies offset from the carrier at multiples of the driving frequency but none at the original carrier frequency. In this special case the carrier is said to be depleted. Thus, any optical interference between the error beam and the main beam will not produce any spurious signals within the system's bandwidth, just as in the pure frequency shift example set forth above.

While a simple phase modulation of the optical carrier beam has been demonstrated, there are other waveforms which can accomplish the same desired result. The possible waveforms which can be used to minimize the coherent cross terms in Eq. 1 which give rise to in-band interference effects can be determined by noting the nature of the interference cross term given by F and proportional to a cosine function as shown below.

$$F(S \times S) \sim \cos(\phi(t)) \quad (2)$$

This implies that, in order to eliminate the effects of this term within the RF bandwidth of interest, $\phi(t)$ must be chosen such that the time average of this term is approximately zero.

$$\overline{\cos(\phi(t))} \approx 0 \quad (3)$$

where the time average interval is comparable to the inverse of the highest frequency in the RF band of interest. In practice this time interval must be no greater than the inverse of twice the highest frequency. There are a number of solutions which satisfy this condition. A partial list is shown below.

Sine/cosine wave with amplitude 2.405 radians or any other amplitude corresponding to a zero in J0.

Frequency modulated signal with amplitude 2.405 radians or any other amplitude corresponding to a zero in J0.

A combination of harmonic signals.

Limited bandwidth random noise with the proper characteristics so as to deplete the carrier.

Due to the one-to-one correspondence between the voltage applied to the phase modulator and the induced phase shift, any solution to Eq. 3 can be realized by applying an electrical signal in the form of the solution directly to the phase modulator electrodes.

Those skilled in the art will note then, that the present invention corrects for nonlinear distortion in fiber optic system using interferometric modulators such as the Mach-Zehnder interferometer, although other apparatus providing optical modulation can be equivalently substituted. The present invention involves the addition of a correction signal on the optical transmission path which contains the error canceling information. Furthermore, one light source can be used and the system can be made independent of wavelength. This is possible because of the frequency shifting or phase scrambling of the additive correction signal achieved through the use of a phase or frequency modulator which insures the corrective light signal adds incoherently or quasi-incoherently within the signal bandwidth of interest. The present system provides correction which is also substantially independent of link length in optical fiber systems.

Figure 3:
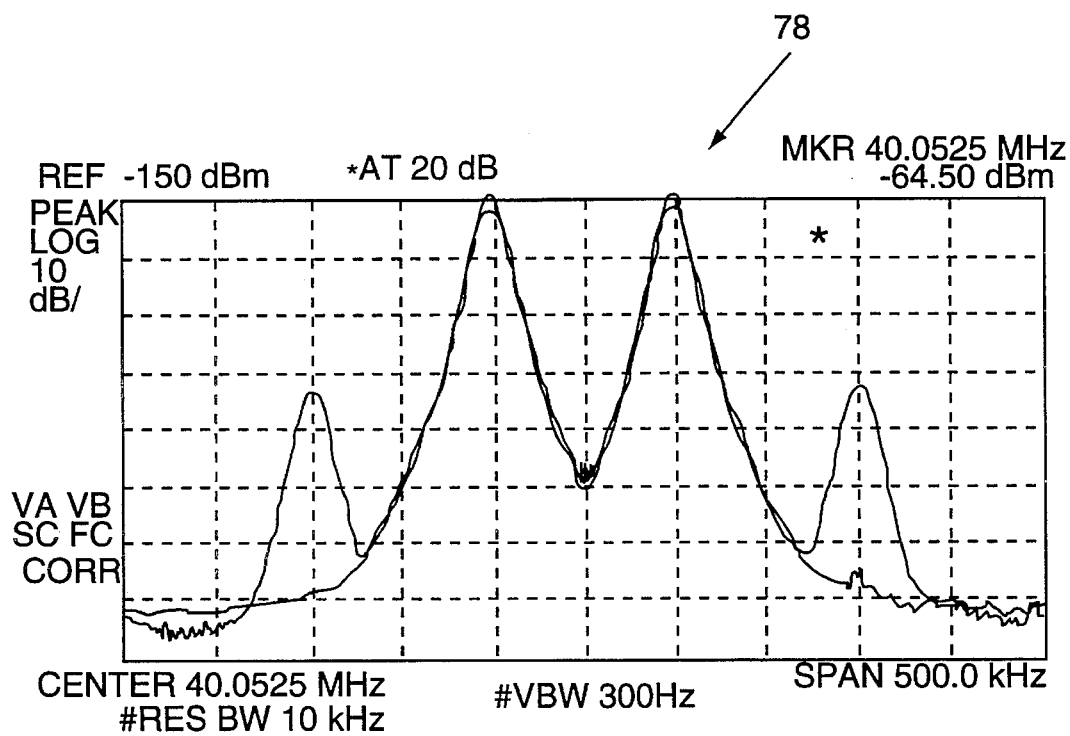
FIG. 3 is a diagrammatic representation of modulated optical signals including a signal as compensated by the system of FIG. 2.

FIG. 3 graphically illustrates the performance characteristics the system of FIG. 2. Diagram 78 shows amplitude versus frequency signal presented to the system with and without correction. Two tones of frequency at 40 and 40.1 Mhz were used as the RF input signal to the system as simulated typical input. A tone of 400 Mhz was applied to the phase modulator to accomplish the elimination of the coherent cross term set forth in equation 1. The input RF signals were adjusted to produce appreciable third order distortion as evidenced by the spurs at 39.9 and 40.2 Mhz in the uncorrected trace 80. When the corrective network was enabled, there was a reduction of the distortion spurs of more than 30 dB, as by trace 82, indicating vastly improved linearity of the system.

Figure 4:
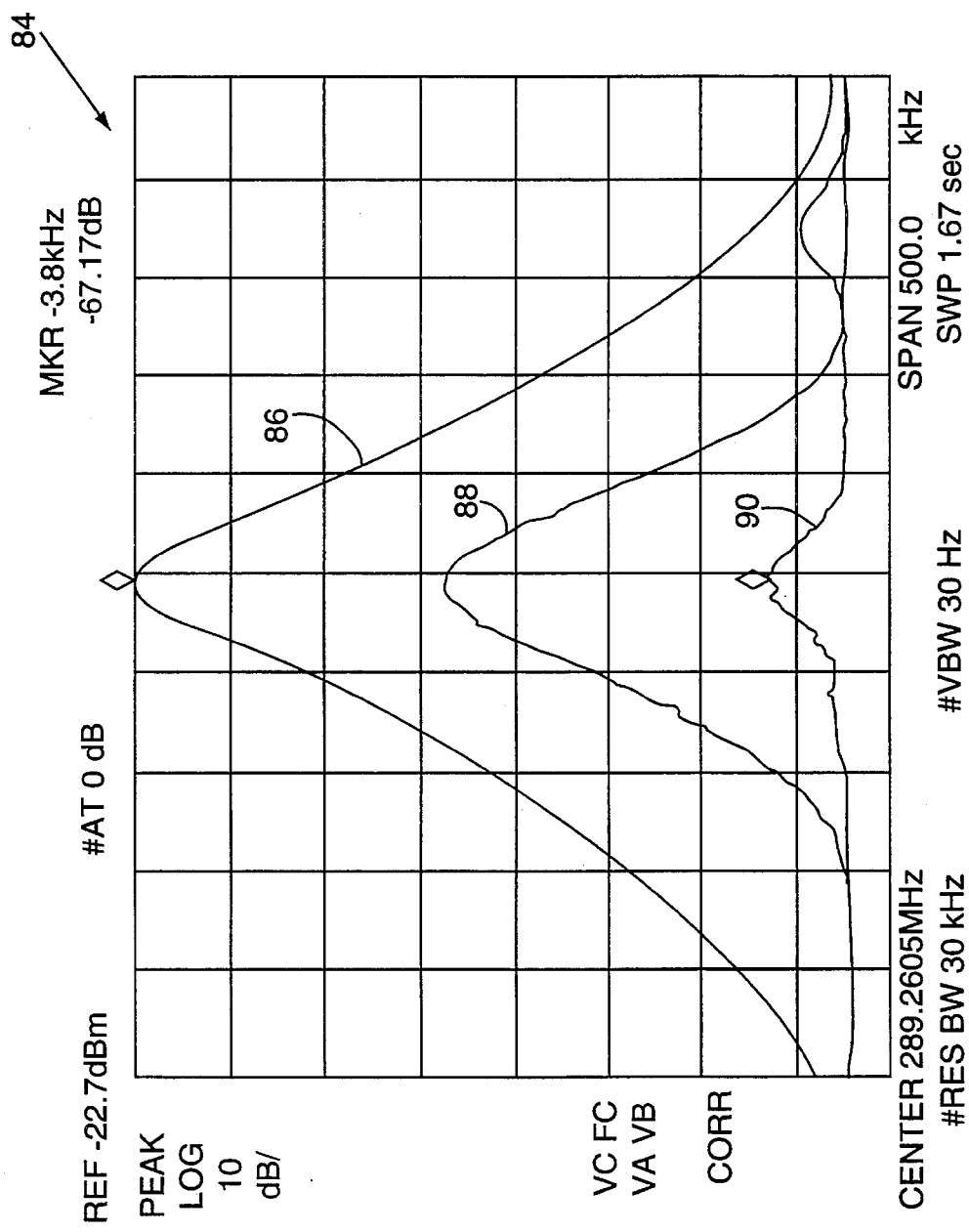
FIG. 4 is a diagrammatic representation of modulated optical signals showing a composite triple beat measurement.

An additional perspective on the present invention can be seen by way of reference to FIG. 4. Shown therein is a diagram 84 indicative of the system's performance using simulated cable television (CATV) carriers at frequencies consistent with national telecommunications standard NTSC specifications. In this case, a 60 channel system was used with a modulation index (OMI) of approximately 6.4% per channel, with the carrier centered at 289.25 Mhz. The phase modulator signal has an approximate frequency of 1 GHz and at an amplitude sufficient to eliminate the coherent crossterms between the main and error optical beams. Trace 86 demonstrates the system performance with the carrier signal on. There is appreciable composite triple beat (CTB) signal component, as evidenced by the large amount of signal present when the carrier signal was turned off (trace 88). This indicates that there is significant and unacceptable nonlinear distortion in the system. When the corrective network was turned on (trace 90), there was a significant reduction in the CTB signal, corresponding to a significant improvement in the linearity of the system.

Figure 5:
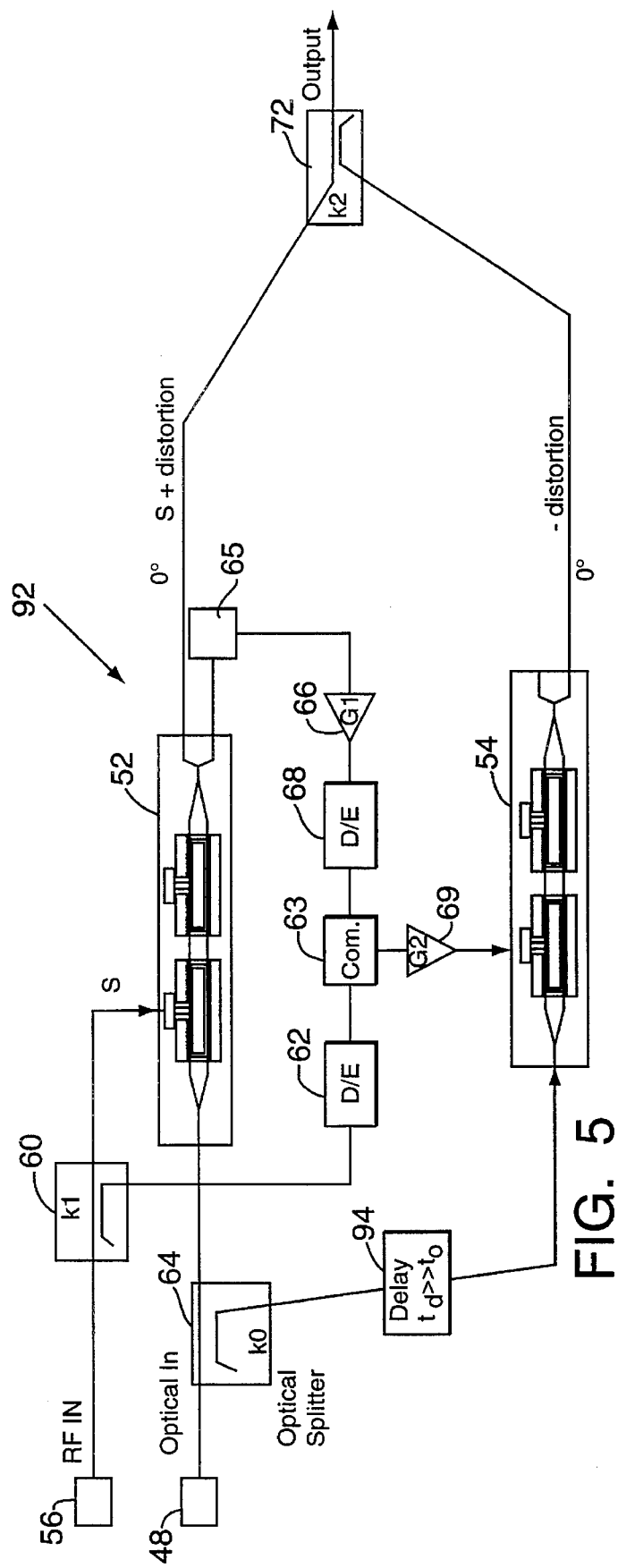
FIG. 5 is a simplified schematic representation of a first alternative embodiment of the present invention utilizing phase delay.

The present invention encompasses embodiments that utilize alternatives to externally modifying the coherence in order to achieve a reduction in the coherent cross term of Eq. 1. One embodiment takes advantage of the natural finite coherence length or temporal coherence length of any laser source. In this alternative embodiment, a portion of the laser beam can be delayed by a time much greater than the laser's characteristic coherence time, $\tau_c$. If this delayed light source is used as the light source for the feed-forward modulator, the lack of coherence between it and the light from the main phase modulator will insure a reduction or elimination of the coherent cross term. FIG. 5 is a simplified schematic illustration of a first alternative embodiment of the present invention. The system 92 is substantially the same as that shown with respect to FIG. 2, but additionally includes a delay element 94 which receives the extracted optical beam prior to presentation to the error correction modulator. The delay element retards the extracted beam for a time much greater than the coherence time, $\tau_c$. This allows incoherent addition at the final coupler to form the output optical beam. The delay element obviates the need for a phase modulator and associated signal generator.

Coherence time is commonly expressed as expressed as a characteristic length, $L_c$. This length is the distance over which light would travel in the coherence time. Typical coherence lengths for laser sources vary from ten meters to several hundreds of meters for diode lasers, while diode pumped solid state (DPSS) lasers have a coherence length of many kilometers. The delay element is preferably a coil of optical fiber of appropriate length. Note that from a practical point of view, it is currently not cost effective to include the length of fiber in a fiber delay line needed to achieve the required delay for DPSS lasers. However, fiber delay lines for diode lasers are realizable with moderate lengths of fiber and are, therefore, economically viable.

Figure 6:
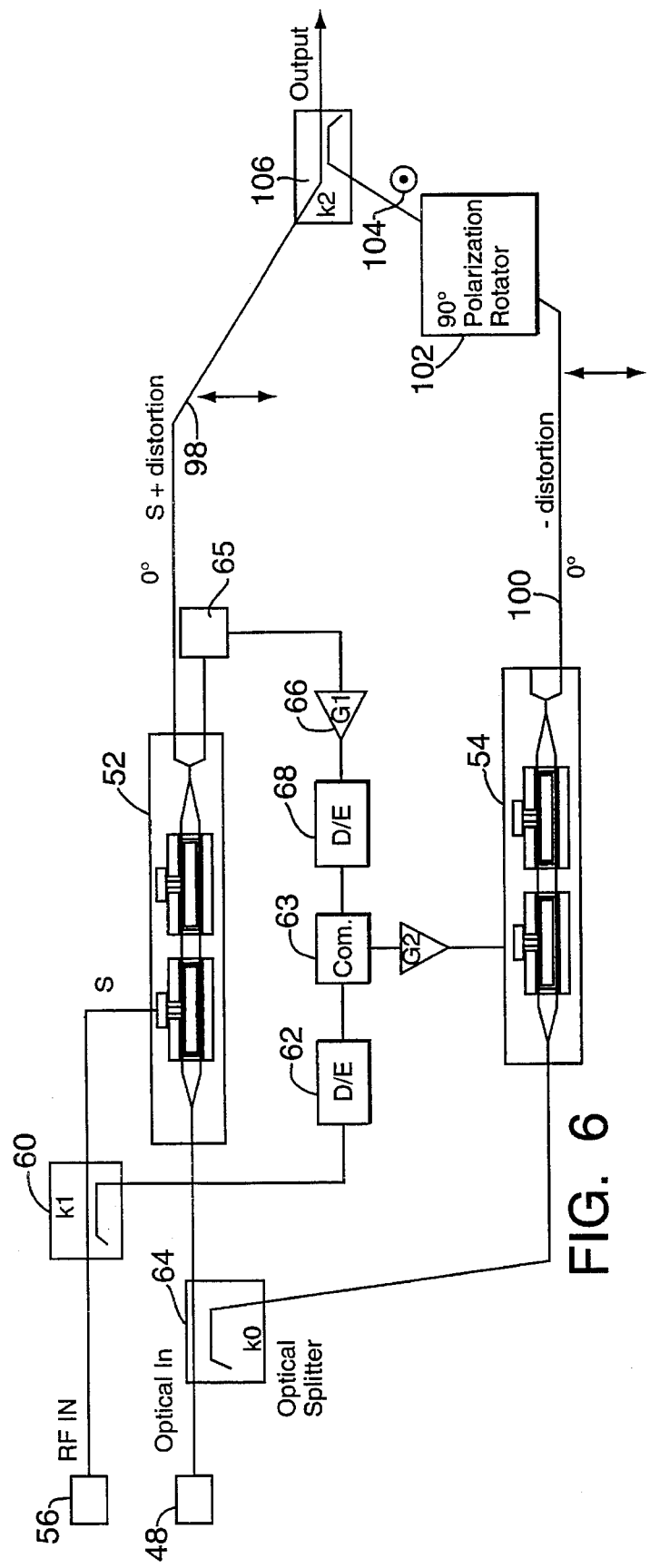
FIG. 6 is a simplified schematic representation of a second alternative embodiment of the present invention utilizing orthogonal states of polarization.

Another, more simple alternative approach to embody the present invention is to use orthogonal states of polarization for the main and feed-forward error modulators. Interference between the combined beams is precluded in this embodiment if orthogonality of the two optical signals is maintained. Referring now to FIG. 6, there is schematically shown a second alternative system 96. The system 96 is substantially the same as the system shown with respect to FIG. 2 and is realized by providing the modulators with polarization maintaining fiber 98, 100 at their respective outputs for receiving the modulated optical beams. There is also a 90 degree polarization rotator 102 that receives the optical beam modulated by the correction modulator. Thereafter, a rotated correction beam 104 is combined with the main modulated optical beam 100 by coupling the same to orthogonal states of a polarization maintaining coupler 106. This provides stable, feed-forward correction signal to the degree that the two signals are truly orthogonal and therefore do not interfere.

Figure 7:
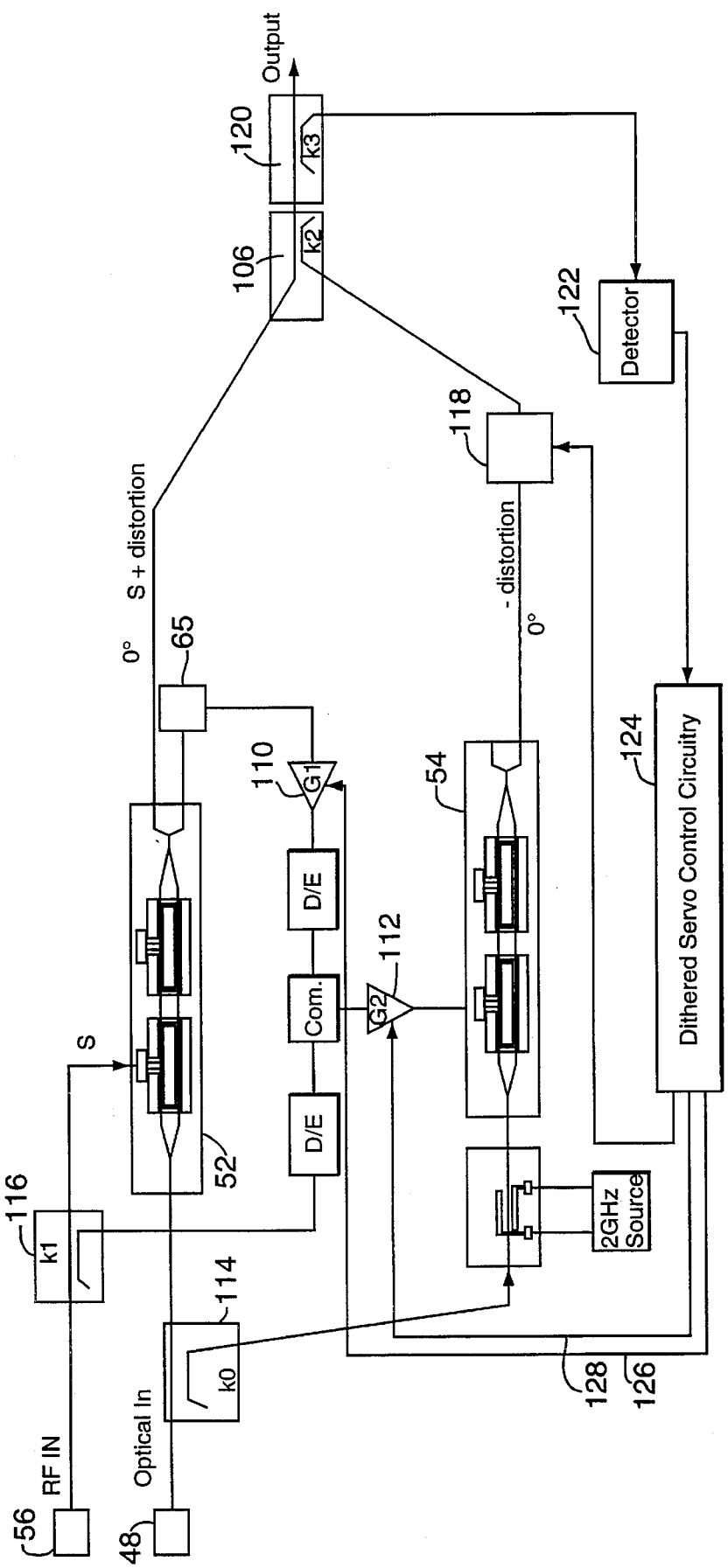
FIG. 7 is a simplified schematic representation of an other alternative embodiment of the present invention utilizing dithered servo control of feed forward parameters.

FIG. 7 is a simplified schematic illustration of a third alternative embodiment to the present invention. Shown in the figure is a system 108 that is substantially the same as shown with respect to that of FIG. 2 with the inclusion of elements that allow for active control. In general, the parameters which govern the amplitude of the correction signal and therefore the degree of cancellation of the distortion products in a system's output beam need to be controlled accurately in order to assure optimum performance. Once the phase of the corrective RF signal is adjusted to maximize cancellation of the distortion products, the only critical parameter is the relative RF gain between the main and correction optical circuits through the final coupler. This gain can easily be adjusted via electrical control of the RF signal gain of either amplifier 110 or 112 or by adjusting the amount of optical power emanating from the output of either or both modulators by varying the amount of optical coupling provided by couplers 114 or 116 or by adding and additional intensity modulator 118 in either the correction (or main) optical circuits. Subsequently, this relative gain can be optimized by monitoring the cancellation of either the distortion products or a test signal by using a dithered servo or other common optimization technique. In the embodiment shown in FIG. 7, the system 108 also includes an output beam coupler 120 which presents a portion of the output beam to a detector 122 whose signals are provided to dither servo control circuitry 124 of a known type. Output control signals are presented on lines 126, 128 to amplifiers 110 and 112. Alternatively, control signals could be presented to optical splitters 114, 116 or either the main or correction modulator.

Figure 8:
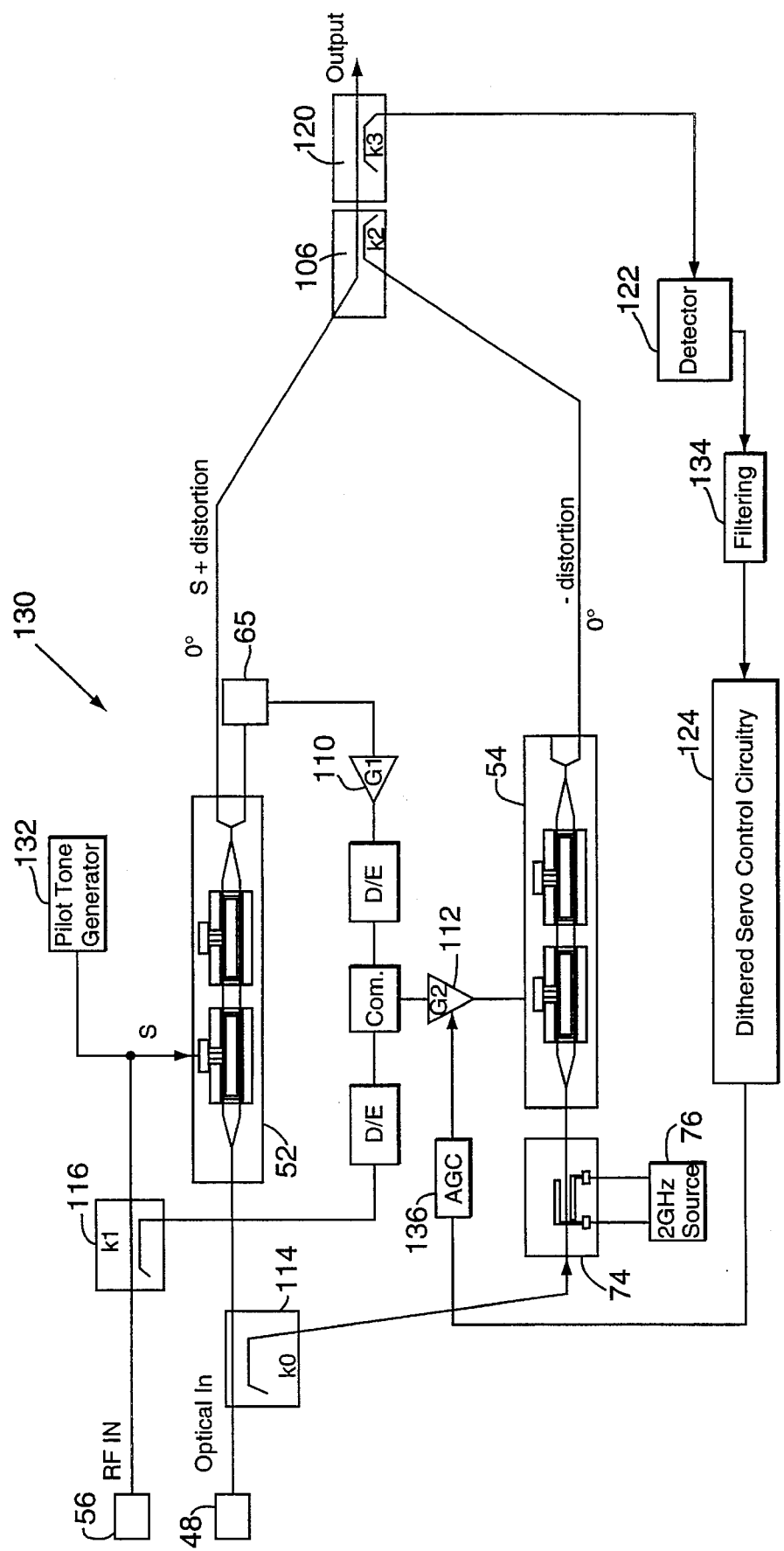
FIG. 8 is a simplified schematic representation of still another alternative embodiment of the present invention utilizing dithered servo control with a pilot tone added to the main modulator.

FIG. 8 is a simplified schematic illustration of a fourth alternative embodiment to the present invention. Shown in the figure is a system 130 that is also substantially the same as shown with respect to that of FIG. 2 with most of the features of the system 108 shown in FIG. 7. However, the system 130 includes a frequency generator 132 for providing a pilot signal in the data frequency band for dithering purposes. This signal is added to the RF input signal to the main modulator after the tapped RF signal is split for the error correction circuitry. Consequently, the signal combiner receives the RF input signal which is a reference, while the signal presented to the combiner by amplifier 110 contains the modulator error plus error terms introduced by the dither signal. Also included in this embodiment is filter 134 for filtering the signals received from photodetector 122.

In operation, a pilot or test tone is continuously fed into the main modulator the system 130 after the initial RF coupler. This pilot tone appears to the feed-forward system as a distortion product which must be canceled. In fact there is no difference, apart from its origin, between this tone and any distortion product created in the main modulator. The degree of cancellation of this tone will exactly mimic the cancellation of any distortion and is, therefore, an excellent measure of system performance. The RF gain (G2) of amplifier 110 is controlled via an output signal from a voltage controlled gain element 136 or AGC. The AGC signal is continuously dithered around some gain error level which is generally slowly varying. This dithered gain will be evident at the output of the detector monitoring the final output.

Filtering is used to reduce the bandwidth of the signal entering the servo circuitry, but the frequencies around the pilot tone frequency are preserved. These frequencies can be placed at any location in the bandwidth of the system. The amplitude of the detected pilot tone emerging from the filtering network will be varying in synchronization with the dithered gain. The phase, relative to the dither signal, and its amplitude can be used to determine the magnitude and direction of deviation from optimum cancellation through the use of standard synchronous detection schemes employed in servo feedback systems. The phase to the feedback loop is chosen so as to drive the detected pilot tone to a minimum, thus indicating maximum cancellation. While a single pilot tone was used in the embodiment of FIG. 8, any combination of tones or noise signals can be employed to monitor cancellation. In this manner, several regions of the RF spectrum of operation can be simultaneously monitored.

Figure 9:
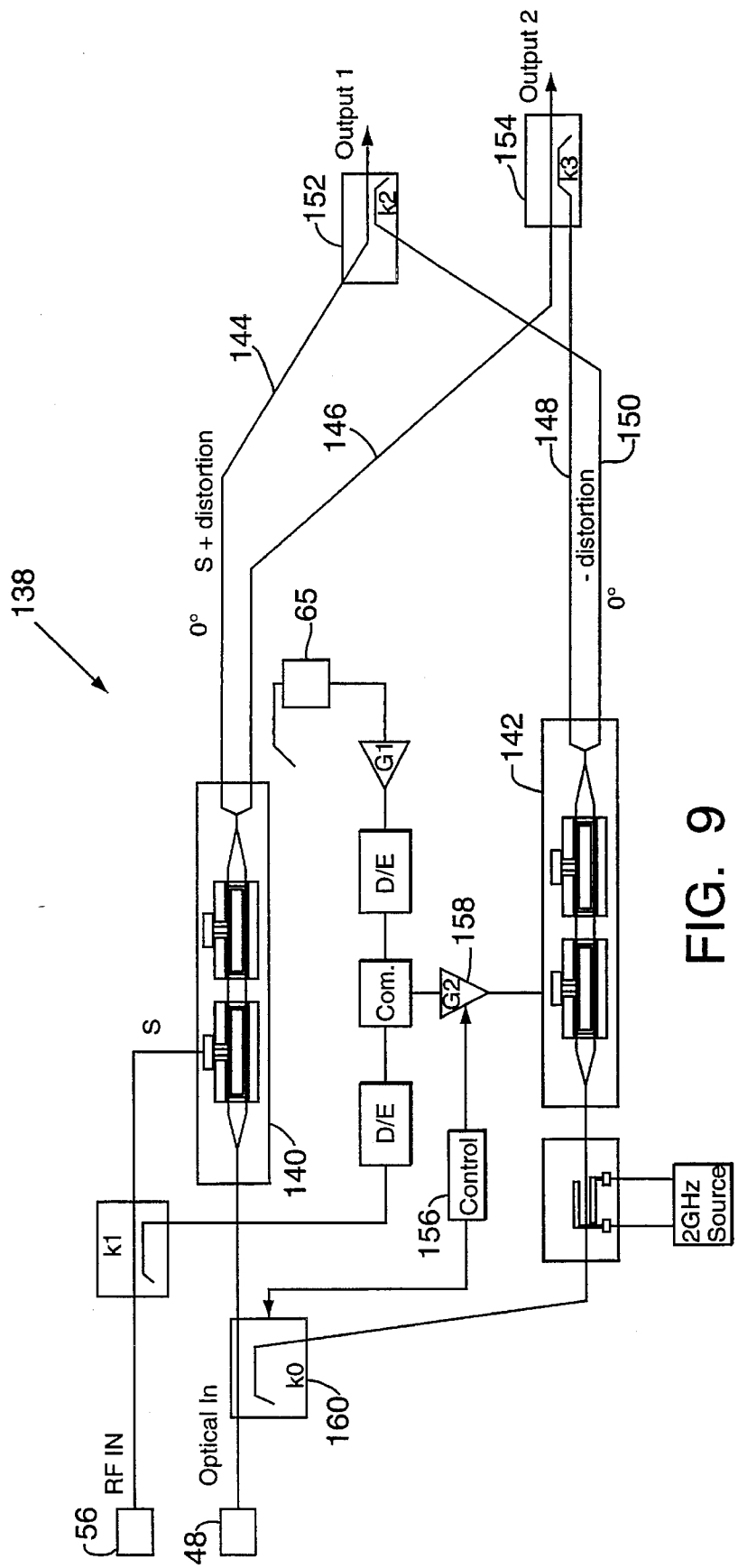
FIG. 9 is a simplified schematic representation of another alternative embodiment of the present invention utilizing active control of relative signal gains.

In many applications, dual output beam operation of the system is desired. An example of such a system is shown schematically in FIG. 9 in which two main modulator output beams are corrected for distortion and are available for use. System 138 provides feed forward correction in basically the same manner as used with single output systems with the following modifications. The system 138 includes dual output main modulator 140, 142 for generating main beams 144 and 146, and dual output correction modulator 142 generates feed forward beams 148, 150.

Figure 10:
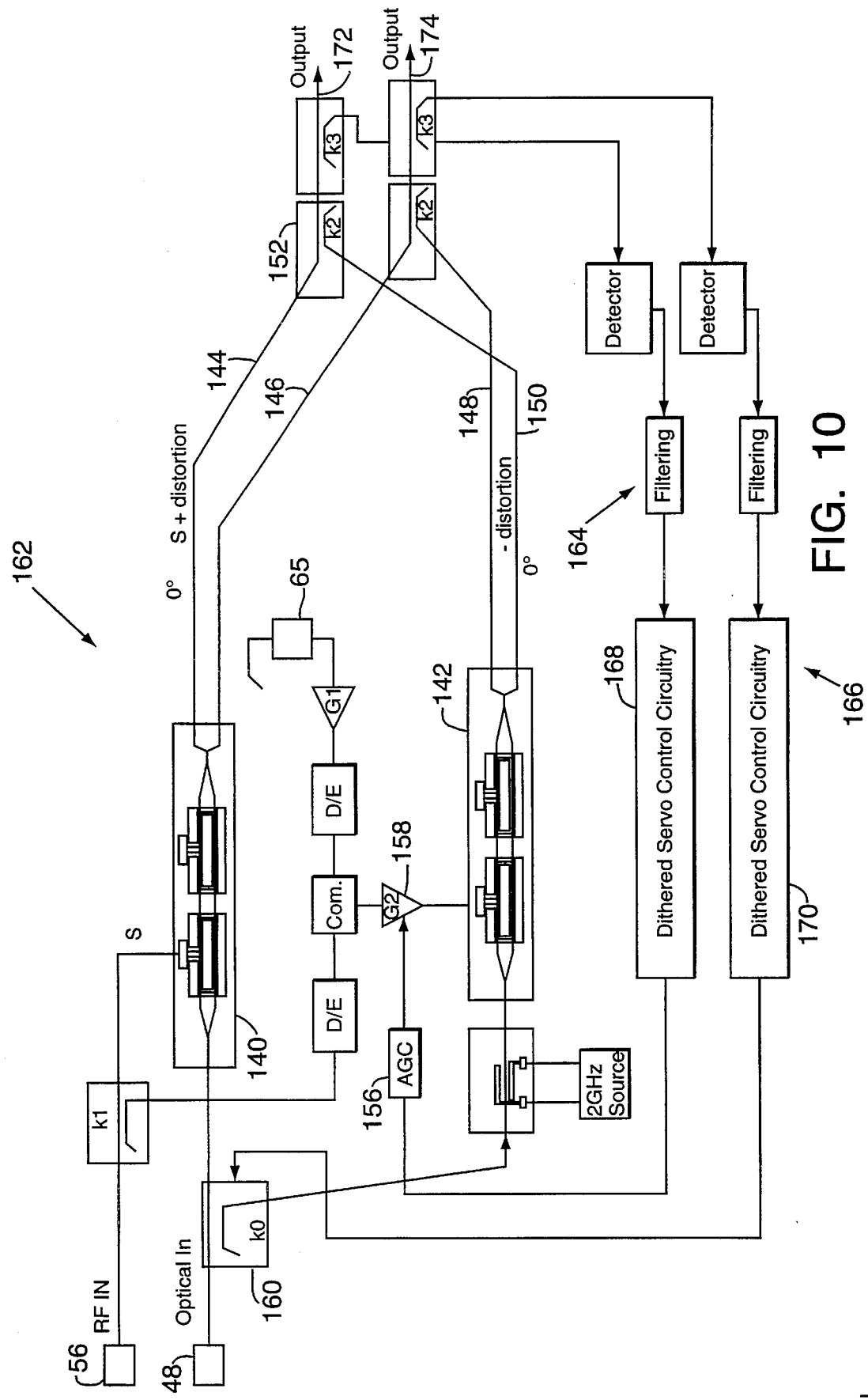
FIG. 10 is a simplified schematic representation of another alternative embodiment of the present invention generating two output beams.

In this system, the phase of the RF signals must simultaneously be set for maximum cancellation in each output. This is preferably achieved by fabricating the system with closely controlled fiber lengths so as to insure a small relative phase offset between all of the main and correction signals at each combiner 152, 154. Control of the interference cancellation can be achieved using control circuitry 156 by varying the relative gain of either the main modulator output beams or the correction modulator output beams. For example, the gain of amplifier 158 (G2) and coupling provided by coupler 160 (kO) can be manipulated in a simple fashion to attain optimum cancellation at each of the system outputs simultaneously. Any combination of electrical or optical elements which varies the relative gain of the main or correction signals can be employed in a similar fashion. Furthermore, closed loop optimization can be achieved as shown schematically in FIG. 10 with system 162 using the same principles discussed previously with the system of FIG. In the system 162, two servo loops 164, 166 are formed, each monitoring the cancellation of one of the output beams, with separate servo control circuits 168, 170 optimizing the content of each output beam 172, 174.

Similarly, although the invention has been shown and described with respect to a preferred embodiment thereof, it should be understood by those skilled in the art that various other changes, omissions and additions thereto may be made therein without departing from the spirit and scope of the present invention. For example, the embodiment of FIG. 2 may be modified by inserting the phase modulator into the main optical beam, thereby creating the differential optical phase.

I claim:

1. A system for providing compensation for optical nonlinearities in an optical system that transmits data signals in a data transfer frequency band, said system comprising:

an optical source for providing a coherent main optical beam;

a beam splitter means for receiving said optical beam and providing first and second split optical beams;

a frequency generator for generating a radio frequency (RF) modulation signal whose frequency spectrum includes said data transfer frequency signal band;

a RF signal tap means for extracting a reference portion of said RF modulation signal;

a main modulator means for receiving said RF modulation signal and modulating said first split optical beam to output a modulated main optical beam having modulated and distorted optical components;

a quasi-incoherent compensation apparatus including;

a means for generating a synthesized optical beam incoherent with said main optical beam in said data frequency signal band such that no optical interference products between said main and synthesized optical beams occur within said data transfer frequency band when said main and synthesized optical beams are combined;

a means for generating an error signal indicative of the difference between said RF signal and said distortion portion of said main optical beam;

a compensation modulator means for receiving said error signal and modulating said second split optical beam to output a modulated compensation optical beam; and an optical combiner means for receiving said main and compensation optical beams and providing therefrom a compensated output beam.

2. The system of claim 1 wherein said quasi-incoherent compensation apparatus further comprises:

a detector means for receiving a first portion of said modulated main optical beam for providing electrical signal equivalents thereof;

a signal combiner means for receiving said detector means signals and said reference RF signals and generating therefrom signals corresponding to the difference between said received signals;

a phase modulation frequency generator for generating a phase modulation signal at a frequency outside of said data frequency signal band;

a phase modulation means for receiving said second split optical beam and phase modulation signal for providing a phase modulated second optical beam; and a correction modulator means for receiving said difference signal and said phase modulated second optical beam to output, as part of said synthesized beam, a modulated correction optical beam having a distorted optical component substantially equal in magnitude to but opposite in phase to said modulated main optical beam distortion component.

3. The system according to claim 2 further comprising a means for selecting the phase of said RF signal;

a means for generating signals indicative of detected optical power in said compensated output beam; and a gain adjustment means for receiving said compensated output beam power signals and for adjusting said relative RF signal gain between said main and said synthesized optical beams;

said RF signal phase and said relative RF signal gain selected to maximize cancellation of said distorted optical components.

4. The system of claim 3 wherein said gain adjustment means further comprises a means for adjusting the magnitude of the optical power removed from said main optical beam.

5. The system of claim 3 wherein said gain adjustment means further comprises a means for adjusting the magnitude of the modulation by said correction modulator means.

6. The system of claim 1 wherein said compensated output optical beam is described by $$I_{out} = S^2 \text{Main} + S^2 \text{Error} + F(S_{Main} \times S_{Error})$$

where $I_{out}$ is the photocurrent in a detector, $S_{Main}$ and $S_{Error}$ are the optical field amplitudes from the main and the compensation modulators, respectively, and F is a function of the product represented in its argument, and where said compensation modulator means generates a synthesized optical beam such that:

$$F(S_{Main} \times S_{Error}) \sim \cos(\phi(t)) \sim 0$$

within the data transfer frequency band.

7. The system of claim 6 wherein ø(t) corresponds to a sine/cosine wave with amplitude 2.405 radians or an amplitude corresponding to a zero in a Bessel function, J0.

8. The system of claim 6 wherein ø(t) corresponds to a frequency modulated signal with amplitude 2.405 radians or an amplitude corresponding to a zero in a Bessel function, J0.

9. The system of claim 6 wherein ø(t) corresponds to a combination of harmonic signals.

10. The system of claim 6 wherein ø(t) has a limited bandwidth random noise selected so as to deplete a carrier frequency.

11. The system of claim 1 wherein said quasi-incoherent compensation apparatus further comprises:
- a detector means for receiving a first portion of said modulated main optical beam for providing electrical signal equivalents thereof;
- a signal combiner means for receiving said detector means signals and said reference RF signals and generating therefrom signals corresponding to the difference between said received signals;
- a time delay means, receiving said second split optical beam, for providing a temporal delay whose magnitude is selected to be greater than a coherence time for said main optical beam; and
- a correction modulator means for receiving said difference signal and said time delayed second optical beam to output, as part of said synthesized beam, a modulated correction optical beam having a distorted optical component substantially equal in magnitude to but opposite in phase to said modulated main optical beam distortion component.

12. The system of claim 1 wherein said coherent main optical beam has an initial polarization state and wherein said quasi-incoherent compensation apparatus further comprises:
- a detector means for receiving a first portion of said modulated main optical beam for providing electrical signal equivalents thereof;
- a signal combiner means for receiving said detector means signals and said reference RF signals and generating therefrom signals corresponding to the difference between said received signals;
- a correction modulator means for receiving said difference signal and said second optical beam to output, as part of said synthesized beam, a modulated correction optical beam having a distorted optical component substantially equal in magnitude to but opposite in phase to said modulated main optical beam distortion component;
- a polarization rotator means for receiving said modulated synthesized optical beam and generating a 90 degree phase rotated synthesized optical beam; and
- wherein said optical combiner means further comprises a means for maintaining said polarization states of said phase rotated, modulated synthesized optical beam and said modulated main optical beam.

13. The system of claim 1 wherein said a quasi-incoherent compensation apparatus further comprises:
- a detector means for receiving a first portion of said modulated main optical beam for providing electrical signal equivalents thereof;
- a signal combiner means for receiving said detector means signals and said reference RF signals and generating therefrom signals corresponding to the difference between said received signals;
- a correction modulator means for receiving said difference signal and said second optical beam to output, as part of said synthesized beam, a modulated correction optical beam having a distorted optical component substantially equal in magnitude to but opposite in phase to said modulated main optical beam distortion component; wherein said system further comprises
- a pilot tone signal generator for providing a signal a pilot frequency for presentation to said main modulator in combination with said RF modulation signal subsequent to said RF signal tap;
- an output signal detector means for generating electrical signal equivalents of said output optical beam; and
- a dither servo control circuit means receiving said output beam detector signals having a pilot tone signal portion, said dither servo control circuit means including automatic gain control means for varying the magnitude of gain control signals presented to said combiner means about a value thereof corresponding to a minimum of said output beam detector signal pilot tone signal portion.

14. The system of claim 13 wherein said pilot tone signal generator further comprises means for providing a signal a plurality of pilot frequencies for presentation to said main modulator in combination with said RF modulation signal subsequent to said RF signal tap; and
- wherein said dither servo control circuit means automatic gain control means further includes means for varying the magnitude of gain control signals presented to said combiner means about values corresponding to a one of corresponding minimums of said output beam detector signal pilot tone signal portions.

15. The system of claim 1 wherein said a quasi-incoherent compensation apparatus further comprises:
- a detector means for receiving a first portion of said modulated main optical beam for providing electrical signal equivalents thereof;
- a signal combiner means for receiving said detector means signals and said reference RF signals and generating therefrom signals corresponding to the difference between said received signals;
- a correction modulator means for receiving said difference signal and said second optical beam to output, as part of said synthesized beam, a modulated correction optical beam having a distorted optical component substantially equal in magnitude to but opposite in phase to said modulated main optical beam distortion component; wherein said main modulator means further comprises
- a means for generating two main output beams and said correction modulator means further comprises means for generating two modulated correction optical beams; and
- a second combiner means for receiving said second main and modulated correction beams and generating therefrom a second compensated output beam.

* * * * *